United States Patent
Qu

(10) Patent No.: US 9,021,459 B1
(45) Date of Patent: Apr. 28, 2015

(54) HIGH AVAILABILITY IN-SERVICE SOFTWARE UPGRADE USING VIRTUAL MACHINE INSTANCES IN DUAL CONTROL UNITS OF A NETWORK DEVICE

(75) Inventor: Hui Qu, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 437 days.

(21) Appl. No.: 13/247,537

(22) Filed: Sep. 28, 2011

(51) Int. Cl.
G06F 9/44 (2006.01)
G06F 9/445 (2006.01)

(52) U.S. Cl.
CPC .. *G06F 8/65* (2013.01); *G06F 9/441* (2013.01)

(58) Field of Classification Search
CPC .................................... G06F 8/65; G06F 8/67
USPC .......................................... 717/170; 709/220
See application file for complete search history.

(56) References Cited

U.S. PATENT DOCUMENTS

| | | | |
|---|---|---|---|
| 6,795,966 B1 | 9/2004 | Lim et al. | |
| 7,003,692 B1 | 2/2006 | Banks et al. | |
| 7,275,081 B1 | 9/2007 | Katz et al. | |
| 7,359,377 B1 | 4/2008 | Kompella et al. | |
| 7,739,403 B1 | 6/2010 | Balakrishna et al. | |
| 7,804,769 B1 | 9/2010 | Tuplur et al. | |
| 7,814,995 B2 | 10/2010 | Clauseh et al. | |
| 8,055,933 B2 | 11/2011 | Jaehde et al. | |
| 8,190,720 B1 * | 5/2012 | Yellai et al. | 709/221 |
| 8,245,217 B2 | 8/2012 | Raman et al. | |
| 8,291,258 B2 | 10/2012 | Narayanaswamy et al. | |
| 8,352,558 B2 | 1/2013 | Boctor et al. | |
| 8,495,618 B1 | 7/2013 | Inbaraj et al. | |
| 2002/0073135 A1 | 6/2002 | Meyer | |
| 2004/0042395 A1 * | 3/2004 | Lu et al. | 370/225 |
| 2005/0289540 A1 | 12/2005 | Nguyen et al. | |
| 2006/0233182 A1 | 10/2006 | Appanna et al. | |
| 2007/0061372 A1 * | 3/2007 | Appavoo et al. | 707/200 |
| 2007/0083723 A1 | 4/2007 | Dey et al. | |
| 2007/0169083 A1 | 7/2007 | Penubolu et al. | |
| 2007/0255764 A1 | 11/2007 | Sonnier et al. | |
| 2008/0034365 A1 | 2/2008 | Dahlstedt | |
| 2008/0244552 A1 | 10/2008 | Toeroe | |
| 2008/0244577 A1 | 10/2008 | Le et al. | |

(Continued)

OTHER PUBLICATIONS

Chandra et al. "Capabilities Advertisement with BGP-4", RFC 2842, Network Working Group, May 2000, 4pgs.*

(Continued)

*Primary Examiner* — Wei Zhen
*Assistant Examiner* — Mohammed Huda
(74) *Attorney, Agent, or Firm* — Shumaker & Sieffert, P.A.

(57) ABSTRACT

Techniques are described for providing high availability (HA) during an in-service software upgrade (ISSU) of a network device, e.g., a router, by running a pair of virtual machines on each of a primary control unit and a backup control unit within the router. First virtual machines may be run on the primary and backup control units to provide high availability for the router. Upon receiving an ISSU request for the router, second virtual machines may be initialized on the primary and backup control units. If the ISSU of the primary control unit fails such that the first and second virtual machines on the primary control unit are executing different software systems, the virtual machines on the backup control unit may provide high availability for the router. Similarly, the virtual machines on the primary control unit may provide high availability for the router during the ISSU of the backup control unit.

27 Claims, 8 Drawing Sheets

(56) References Cited

U.S. PATENT DOCUMENTS

| | | |
|---|---|---|
| 2008/0295088 A1* | 11/2008 | Bhat et al. .................... 717/170 |
| 2009/0007135 A1* | 1/2009 | Rathunde et al. ............. 718/107 |
| 2009/0089774 A1 | 4/2009 | Lynch et al. |
| 2009/0100418 A1 | 4/2009 | Raman et al. |
| 2009/0327648 A1 | 12/2009 | Savagaonkar et al. |
| 2010/0057843 A1 | 3/2010 | Landsman et al. |
| 2010/0107158 A1 | 4/2010 | Chen et al. |
| 2010/0115512 A1 | 5/2010 | Sakai |
| 2010/0306770 A1 | 12/2010 | Frank |
| 2011/0173490 A1 | 7/2011 | Narayanaswamy et al. |
| 2012/0072893 A1* | 3/2012 | Gupta et al. .................. 717/168 |
| 2012/0072894 A1* | 3/2012 | Wang et al. .................. 717/168 |
| 2012/0185914 A1 | 7/2012 | Delco et al. |
| 2013/0042323 A1 | 2/2013 | Narayanaswamy et al. |
| 2013/0145359 A1 | 6/2013 | Hanselmann |
| 2013/0191340 A1 | 7/2013 | Ammanur et al. |

OTHER PUBLICATIONS

U.S. Appl. No. 12/182,619 entitled Streamlined Packet Forwarding Using Dynamic Filters for Routing and Security in a Shared Forwarding Plane, filed Jul. 30, 2008.

Response to Office Action mailed Mar. 11, 2014, from U.S. Appl. No. 13/537,760, filed Jun. 11, 2014, 18 pp.

Office Action from U.S. Appl. No. 13/537,760, dated Mar. 11, 2014, 31 pp.

* cited by examiner

HIGH AVAILABILITY IN-SERVICE SOFTWARE UPGRADE USING VIRTUAL MACHINE INSTANCES IN DUAL CONTROL UNITS OF A NETWORK DEVICE

TECHNICAL FIELD

Techniques of this disclosure relate generally to computer networks, and more particularly to a software upgrade mechanism for network devices.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, contain control units or routing engines that maintain routing information describing routes through the network. Each route defines a path between locations on the network. Large computer networks, such as the Internet, often include many routers that exchange routing information according to a defined routing protocol, such as the Border Gateway Protocol (BGP). From the routing information, a forwarding engine of the routers generates forwarding information, which is used by the routers to relay packet flows through the network and, more particularly to relay the packet flows to a next hop. Upon receiving an incoming packet, the router examines information within the packet to identify the destination for the packet. Based on the destination, the router forwards the packet in accordance with the forwarding information.

In some cases, a router may fail due to a failure of either the software system running on a routing engine or the underlying hardware of the routing engine. As a result of the failed router, customers of the computer network may lose service and routing information may need to be updated throughout the computer network to establish routes around the failed router. As one solution, a backup routing engine may be used to provide high availability (HA) for the router during operation of the routing functionality by the primary routing engine. In this case, if the primary routing engine of the router fails, the router may perform a graceful restart, e.g., graceful routing engine switchover (GRES), to the backup routing engine. In order to provide HA, however, the primary routing engine and the backup routing engine must be running the same software system. HA protection, therefore, typically cannot be provided during an in-service software upgrade (ISSU) because, if the ISSU fails to complete, the backup routing engine will be running a different software system than the primary routing engine.

SUMMARY

In general, this disclosure includes techniques for providing high availability during an in-service software upgrade (ISSU) of a network device, e.g., a router, by running a pair of virtual machines on each of a primary control unit and a backup control unit within the router. In a router, a control unit, e.g., a routing engine, may utilize a virtual machine executing on a hypervisor, instead of running directly on top of the hardware, to control routing functionality of the router. This makes it possible for multiple instances of operating systems to run simultaneously on a single control unit or routing engine.

In the case of a router with dual physical routing engines, a first virtual machine may be run on a primary physical routing engine and a first backup virtual machine may be run on a backup physical routing engine. When both virtual machines execute the same software system, the first backup virtual machine on the backup routing engine may provide high availability for the router by enabling a graceful restart, e.g., graceful routing engine switchover (GRES), to the backup routing engine if the primary routing engine fails. According to the techniques, when an ISSU of the router is requested, the backup routing engine may continue to provide high availability for the router during the ISSU of the primary routing engine.

As an example, upon receiving a request for an ISSU of the router, a second virtual machine may be initialized on the primary routing engine and a second backup virtual machine may be initialized on the backup routing engine. The ISSU of the primary routing engine may be performed by installing an upgraded software system on the second virtual machine on the primary routing engine, switching control of the routing functionality for the router from the first virtual machine to the second virtual machine on the primary routing engine, and installing the upgraded software system on the first virtual machine. During the ISSU of the primary routing engine, the first and second backup virtual machines on the backup routing engine may both be executing the original software system. In this way, if the ISSU of the primary routing engine fails before completion such that the first virtual machine and the second virtual machine are executing different software systems, the first and second backup virtual machines on the backup routing engine may provide high availability for the router. Similarly, the first and second virtual machines on the primary routing engine may provide high availability for the router during the ISSU of the backup routing engine.

In one example, a method comprises running a first virtual machine (VM) on a primary control unit of a network device, wherein the first VM executes a first software system that controls routing functionality of the network device and controls an ISSU of the network device, and running a first backup VM on a backup control unit of the network device, wherein the first backup VM executes the first software system and provides high availability for the network device during operation of the routing functionality by the first VM. The method further comprises, in response to receiving an ISSU request with the first VM on the primary control unit, initializing a second VM on the primary control unit and a second backup VM on the backup control unit, wherein each of the second VM and the second backup VM execute the first software system, and performing the ISSU on the primary control unit by upgrading the second VM to a second software system, switching control of the routing functionality from the first VM to the second VM, and upgrading the first VM to the second software system, wherein the first and second backup VMs executing the first software system on the backup control unit provide high availability for the network device during the ISSU of the primary control unit.

In another example, a network device comprises a primary control unit, a backup control unit, a first hypervisor that runs one or more virtual machines on the primary control unit, and a second hypervisor that runs one or more virtual machines on the backup control unit. The network device also includes a first VM running on the primary control unit, wherein the first VM is configured to execute a first software system that controls routing functionality of the network device and control an ISSU of the network device, and a first backup VM running on the backup control unit, wherein the first backup VM is configured to execute the first software system and provide high availability for the network device during operation of the routing functionality by the first VM. Additionally, in response to receiving an ISSU request with the first VM on the primary control unit, the first VM requests initialization of a second VM on the primary control unit by the first hypervisor and a second backup VM on the backup control unit by the second hypervisor, wherein each of the second VM and the second backup VM execute the first software system, and the first VM controls performance of the ISSU on the primary control unit to upgrade the second VM to a second software system, switch control of the routing functionality from the first VM to the second VM, and upgrade the first VM to the second software system, wherein the first and second backup VMs executing the first software system on the backup control unit provide high availability for the network device during the ISSU of the primary control unit.

In a further example, a non-transitory, computer-readable storage medium comprises instructions that cause one or more programmable processors to run a first VM on a primary control unit of a network device, wherein the first VM executes a first software system that controls routing functionality of the network device and controls an ISSU of the network device, and run a first backup VM on a backup control unit of the network device, wherein the first backup VM executes the first software system and provides high availability for the network device during operation of the routing functionality by the first VM. In response to receiving an ISSU request with the first VM on the primary control unit, further instructions cause the programmable processors to initialize a second VM on the primary control unit and a second backup VM on the backup control unit, wherein each of the second VM and the second backup VM execute the first software system, and perform the ISSU of the primary control unit by upgrading the second VM to a second software system, switching control of the routing functionality from the first VM to the second VM, and upgrading the first VM to the second software system, wherein the first and second backup VMs executing the first software system on the backup control unit provide high availability for the network device during the ISSU of the primary control unit.

The details of one or more examples of the invention are set forth in the accompanying drawings and the description below. Other features, objects, and advantages of the invention will be apparent from the description and drawings, and from the claims.

DETAILED DESCRIPTION

Figure 1:
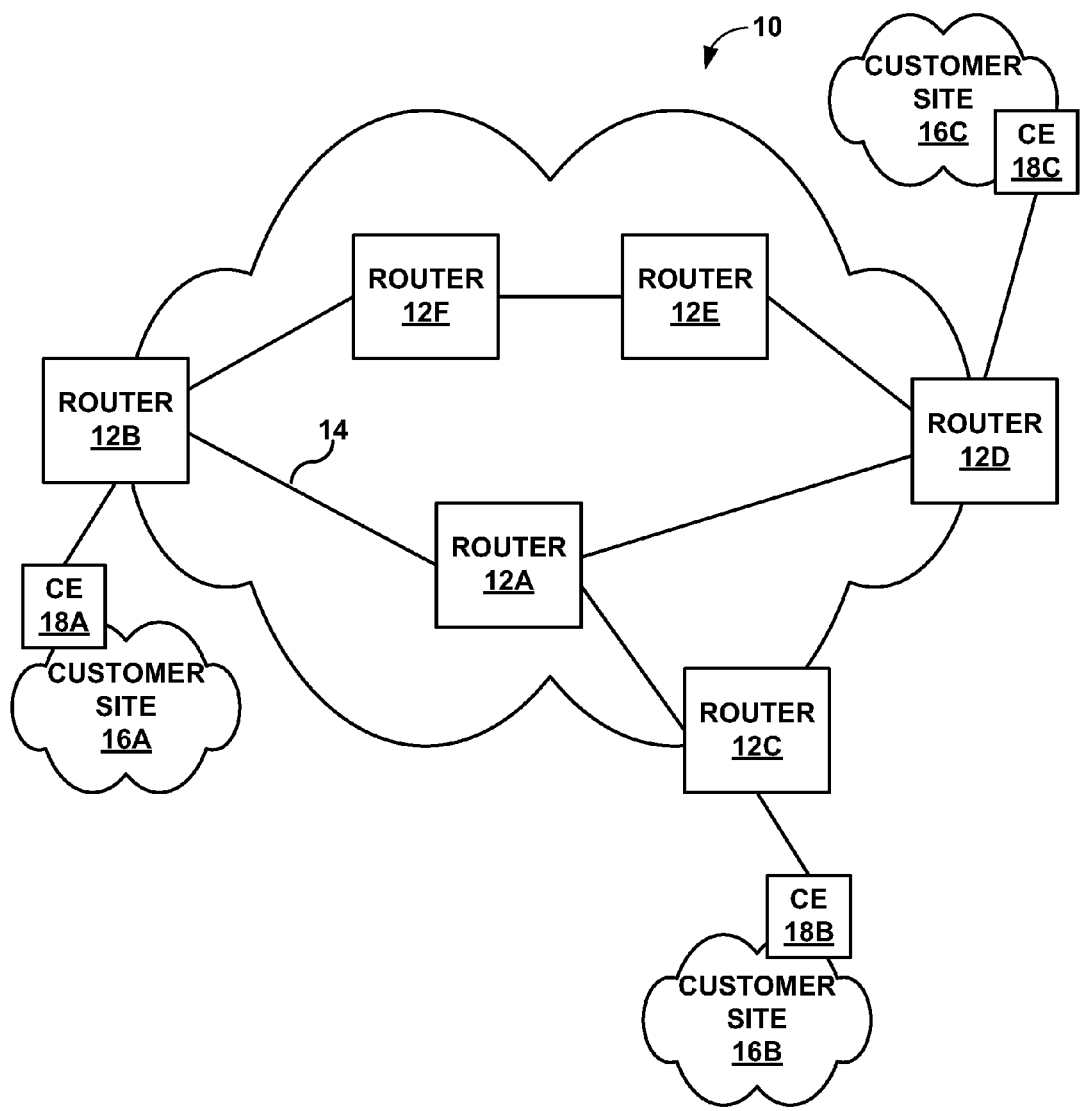
FIG. 1 is a block diagram illustrating an example computer network comprising one or more routers with dual routing engines configured to perform an in-service software update while providing high availability for the router.

FIG. 1 is a block diagram illustrating an example computer network 10 in which one or more of routers 12A-12F ("routers 12") includes dual routing engines configured to perform an in-service software upgrade while providing high availability for the router. Routers 12 exchange routing information with each other to maintain an updated view of the topology of network 10. In the case where one of routers 12 fails, packet forwarding to customer networks 16A-16C ("customer networks 16") may be disrupted while routing information is updated across network 10 to establish routes around the failed one of routers 12. To avoid this disruption, the techniques of this disclosure provide high availability to the one or more of routers 12 that include dual routing engines even during in-service software upgrades (ISSUs) of the routers.

Computer network 10 may comprise the Internet or another public network. In some cases, network 10 may comprise a multi-protocol label switching (MPLS) network. In the illustrated example, network 10 includes routers 12, some of which may comprise edge routers (e.g., router 12B, 12C and 12D) and some of which may comprise core network routers (e.g., router 12A, 12E and 12F). Each of the edge routers 12B, 12C, and 12D couples to one or more remote customer sites 16A-16C ("customer sites 16") via customer edge (CE) routers 18A-18C ("CE routers 18"). For example, router 12B is coupled to customer site 16A via CE router 18A, router 12C is coupled to customer site 16B via CE router 18B, and router 12D is coupled to customer site 16C via CE router 18C.

Each of customer sites 16 may include a local area network (LAN) or a wide area network (WAN) that comprises a plurality of subscriber devices, such as desktop computers, laptops, workstations, PDAs, wireless devices, network-ready appliances, file servers, print servers or other devices. In some cases, one or more of customer sites 16 may be connected in a customer network across computer network 10 to enable customer sites 16 to securely share data over network 10. For example, the customer network may comprise a separate multicast service instance, such as a multicast virtual private network (MVPN) or a virtual private LAN service (VPLS).

In the illustrated example of FIG. 1, routers 12 are connected to each other via network paths, such as network path 14 between router 12A and router 12B. In some cases, one or more routers 12 may establish a label switched path (LSP) within network 10 that connects all of routers 12 to one each other. Each of routers 12 includes at least one routing engine that maintains routing information describing the routes or paths through network 10. A routing engine within one of routers 12 may utilize a virtual machine executing on a hypervisor, instead of running directly on top of the hardware, to control routing functionality of the router. This makes it possible for multiple instances of operating systems to run simultaneously on a single routing engine. In some cases, router 12 may exchange routing information with each other according to a defined routing protocol, such as the Border Gateway Protocol (BGP).

From the routing information, each of routers 12 generates forwarding information used to relay packets through network 10. Upon receiving an incoming packet, router 12A, for example, examines information within the packet to identify the destination for the packet, and then forwards the packet toward the destination in accordance with the forwarding information. As an example, router 12A may receive a packet from router 12C, and based on routing information maintained by router 12A, forwards the packet to a neighboring router, such as router 12B, over network path 14.

In some cases, one of routers 12 may fail due to a failure of either the software system running on a routing engine of the router or the underlying hardware of the routing engine. In order to avoid a total failure of the router, one or more of routers 12 may include dual routing engines. In this case, a backup routing engine may be used to provide high availability for the router during operation of the routing functionality by a primary routing engine. The high availability of the router enables a graceful restart, e.g., graceful routing engine switchover (GRES), from the primary routing engine to the backup routing engine if the primary routing engine fails. In order to provide high availability, however, the primary routing engine and the backup routing engine must be running the same software system. Conventionally, high availability protection could not be provided during an ISSU of the router because, if the ISSU failed to complete, the backup routing engine will be running a different software system than the primary routing engine.

The techniques described in this disclosure enable a backup routing engine to provide high availability for one of routers 12 while performing an ISSU of the router by running a pair of virtual machines on each of the primary routing engine and the backup routing engine within the router. Examples of ISSUs that may be performed on each of routers 12 include upgrading or replacing the operating system, adding support for new routing protocols, adding support for new features, fixing bugs without shutting down (i.e., hotspot bug fixing), saving/restoring routing states, taking a snapshot of routing states at a particular point in time, restoring a routing session based on a snapshot, and restarting routing machines.

In one example, router 12A, e.g., includes dual routing engines with a first virtual machine running on a primary routing engine and a first backup virtual machine running on a backup routing engine. The first virtual machine and the first backup virtual machine may be executing the same software system such that the first backup virtual machine on the backup routing engine may provide high availability for router 12A during operation of the routing session by the first virtual machine on the primary routing engine. Upon receiving a request for an ISSU of router 12A, a second virtual machine may be initialized on the primary routing engine and a second backup virtual machine may be initialized on the backup routing engine. The ISSU of the primary routing engine may then be performed by installing an upgraded software system on the second virtual machine on the primary routing engine, switching control of the routing session for router 12A from the first virtual machine to the second virtual machine on the primary routing engine, and then installing the upgraded software system on the first virtual machine.

During the ISSU of the primary routing engine, the first and second backup virtual machines on the backup routing engine may both be executing the original software system. In this way, the first backup virtual machine on the backup routing engine may continue to provide high availability for router 12A during the ISSU of the primary routing engine. If the ISSU fails before completion such that the first virtual machine and the second virtual machine on the primary routing engine are executing different software systems, control of the routing session for router 12A may be switched to the first backup virtual machine on the backup routing engine. After the switchover, the second backup virtual machine may provide high availability for router 12A during operation of the routing session by the first backup virtual machine. Similarly, the first and second virtual machines on the primary routing engine may provide high availability for router 12A during the ISSU of the backup routing engine.

The first virtual machine on the primary routing engine of router 12A may control the ISSU process described in this disclosure. In this example, the first virtual machine may operate as a master virtual machine and the second virtual machine may operate as a slave virtual machine that synchronizes with the first virtual machine. In addition, the first backup virtual machine on the backup routing engine may operate as a slave virtual machine that synchronizes with the first virtual machine on the primary routing engine. The first backup virtual machine on the backup routing engine may also operate as a master virtual machine of the backup routing engine and the second backup virtual machine on the backup routing engine may operates as a slave virtual machine that synchronizes with the first backup virtual machine. In another example, a management virtual machine may be initialized on the primary routing engine of router 12A in order to control the ISSU process described in this disclosure.

The techniques disclosed include performing an ISSU of a router with high availability during which the routing engine being updated remains in service. In the example above, the primary routing engine of router 12A simultaneously processes an ISSU and continues to forward incoming packets to neighboring routers on the network 10. The techniques are typically described in this disclosure with respect to routers, but the techniques may also be applied to network devices other than routers.

During the switchover from the first virtual machine to the second virtual machine on the primary routing engine, or from the first virtual machine on the primary routing engine to the first backup virtual machine on the backup routing engine, techniques of "non-stop forwarding" and "graceful restart" may be implemented by router 12A to minimize the effect the switchover has on the network 10. For example, while installing the upgraded software system on the second virtual machine and during the switchover from the first virtual machine to the second virtual machine on the primary routing engine, router 12A continues to receive packets from other routers, such as router 12C, and based on routing information maintained by router 12A, continues forwarding the packets to neighboring routers, such as router 12B over path 14. Further details of non-stop forwarding are described in U.S. patent application Ser. No. 11/292,204, filed December 1, the entire contents of which are incorporated by reference herein. Further details of graceful restart are described in U.S. Pat. No. 7,359,377, issued Apr. 15, 2008, the entire contents of which are incorporated by reference herein.

Figure 2:
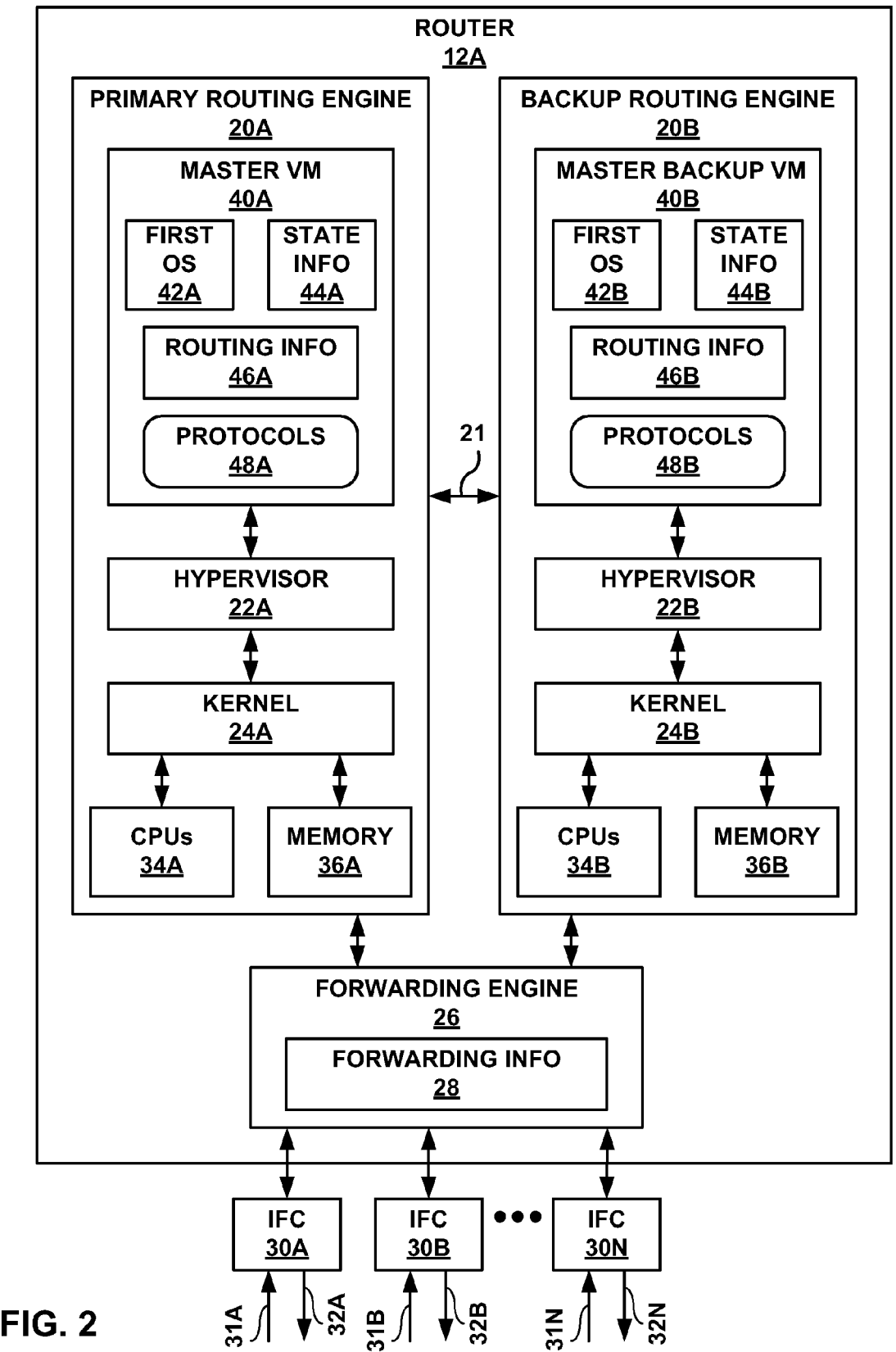
FIG. 2 is a block diagram illustrating a router with dual routing engines capable of implementing techniques for providing high availability during an in-service software upgrade of the router.

FIG. 2 is a block diagram illustrating an example router 12A with dual routing engines capable of implementing techniques for providing high availability during an in-service software upgrade of router 12A. In this example, router 12A comprises a primary routing engine (RE) 20A, a backup RE 20B, forwarding engine 26, and interface network cards (IFCs) 30A-30N ("IFCs 30"). Routing engines 20A-B and forwarding engine 26 receive and send information to network 10 through IFCs 30 via inbound communication links 31A-31B ("inbound links 31") and outbound communication links 32A-32N ("outbound links 32").

The hardware platform of primary RE 20A includes a hypervisor 22A, a kernel 24A, one or more central processing units (CPUs) 34A, and a memory 36A. The hardware platform of backup RE 20B includes a hypervisor 22B, a kernel 24B, one or more CPUs 34B, and a memory 36B. Hypervisor 22A executes on the platform of primary RE 20A to provide an operating environment for one or more virtual machines on primary RE 20A, and hypervisor 22B executes on the platform of backup RE 20B to provide an operating environment for one or more virtual machines on backup RE 20B.

CPUs 34A of primary RE 20A are configured to execute instructions stored in memory 36A, and CPUs 34B of backup RE 20B are configured to execute instructions stored in memory 36B. Memory 36A and memory 36B may comprise one or more computer-readable media, such as a non-transitory, computer-readable storage media. Examples of such media include RAM, ROM, NVRAM, EEPROM, flash memory, and other computer-readable storage media. Kernel 24A manages the physical resources of primary RE 20A, including CPUs 34A and memory 36A, and any additional hardware. Through hypervisor 22A running on top of kernel 24A, router 12A has the capability to concurrently run a plurality of virtual machines, each with its own unique operating system, on primary RE 20A. Similarly, kernel 24B manages the physical resources of backup RE 20B, including CPUs 34B and memory 36B, and any additional hardware. Through hypervisor 22B running on top of kernel 24B, router 12A has the capability to concurrently run a plurality of virtual machines, each with its own unique operating system, on backup RE 20B. Each of hypervisors 22A-22B may, for example, be a proprietary program such as VMWARE® or an open source solution.

As shown in FIG. 2, primary RE 20A may include a master virtual machine (VM) 40A and backup RE 20B may include a master backup VM 40B. Master VM 40A and master backup VM 40B may have a master/slave relationship. For example, master VM 40A may be designated as the master virtual machine for router 12A by its configuration upon start-up on primary RE 20A by hypervisor 22A. Similarly, master backup VM 40B may be designated as the slave virtual machine for router 12A by its configuration upon start-up on backup RE 20B by hypervisor 22B. As the slave virtual machine, master backup VM 40B may continually synchronize with master VM 40A. In the illustrated example of FIG. 2, master backup VM 40B may synchronize with master VM 40A via a connection 21, such as a high-speed internal Ethernet connection.

As the master virtual machine for router 12A, master VM 40A on primary RE 20A controls routing functionality and other functions on behalf of router 12A. Master VM 40A implements one or more routing protocols 48A. Protocols 48A may include, for example, routing protocols, tunneling protocols, and label switching protocols, such as BGP, IS-IS, RSVP-TE and LDP, or other protocols. Master VM 40A uses protocols 48A to perform a variety of functions, such as to exchange routing information, to establish VPNs or LSPs, and for exchanging labels. For example, master VM 40A implement one of protocols 48A to establish at least one routing communication session with neighboring routers 12 in network 10 in order to exchange routing information. Based on the learned routing information, master VM 40A maintains and updates routing information 46A to describe a topology of network 10, and more particularly, routes through network 10.

Master VM 40A analyzes its stored routing information 46A and generates forwarding information 28 for forwarding engine 26. Master VM 40A typically processes routing information 46A to perform route selection and generate forwarding information 28 based on the selected routes. In this way, routes as well as labeling information may be stored into forwarding engine 26. Forwarding information 28 may associate, for example, network destinations with specific next hops. Master VM 40A may generate forwarding information 28 in the form of a radix tree having leaf nodes that represent destinations within network 10. When forwarding a packet, forwarding engine 26 traverses the radix tree to a leaf node based on information within a header of the packet to ultimately select a next hop and output interface to which to forward the packet. Forwarding engine 26 then forwards the packet via the selected one of outbound links 32 of IFCs 30. In the illustrated example of FIG. 2, forwarding engine 26 comprises a single engine that is responsible for the forwarding functionality of router 12A. In other examples, the forwarding functionality may be distributed between separate forwarding engines within each of IFCs 30.

In the example of FIG. 2, master VM 40A executes a first operating system (OS) 42A, such as a version of a network operating system. Master backup VM 40B in backup RE 20B executes a first OS 42B, which is an instance of the same operating system executed by master VM 40A. As a slave virtual machine, master backup VM 40B may continually synchronize with master VM 40A via Ethernet connection 21 to update state information 44B, routing information 46B, and protocols 48B based on state information 44A, routing information 46A, and protocols 48A from master VM 40A. If master VM 40A were to fail due to a software failure of first OS 42A or a hardware failure of primary RE 20A, master backup VM 40B may take over control of the routing session. In this way, master backup VM 40B may provide high availability to router 12A during operation of the routing session by master VM 40A. Example techniques for synchronizing state information between a master routing engine and a backup routing engine are described in U.S. Pat. No. 7,275,081 to Katz, et al., entitled "Managing State Information in a Computing Environment" and U.S. Pat. No. 7,739,403 to Balakrishna et al., entitled "Synchronizing State Information Between Control Units," both of which are incorporated herein by reference.

The techniques described in this disclosure may continue to provide high availability during an ISSU of router 12A by running a pair of virtual machines on each of primary RE 20A and backup RE 20B. As one example, as described in more detail below with respect of FIGS. 3A-3E, upon receiving a request for an ISSU of router 12A, hypervisor 22A may initialize a second VM on primary RE 20A, and hypervisor 22B may initialize a second backup VM on backup RE 20B. The ISSU may first be performed on primary RE 20A by installing an upgraded software system on the second VM, switching control of the routing functionality for router 12A from master VM 40A to the second VM on primary RE 20A, and then installing the upgraded software system on old master VM 40A.

During the ISSU of primary RE 20A, the second backup VM on backup RE 20B executes the same software system as master backup VM 40B. In this way, master backup VM 40B on backup RE 20B may continue to provide high availability for router 12A during the ISSU of primary RE. If the ISSU of primary RE 20A fails before completion, such that master VM 40A and the second VM are executing different software systems, control of the routing functionality for router 12A may be switched to master backup VM 40B on backup RE 20B. After the switchover, the second backup VM on backup RE 20B may provide high availability for router 12A during operation of the routing session by master backup VM 40B. Similarly, the first and second VMs on the primary RE 20A may provide high availability for router 12A during the ISSU of backup RE 20B.

FIGS. 3A-3E are block diagrams illustrating primary RE 20A and backup RE 20B of router 12A at different stages of an in-service software upgrade with high availability.

Figure 3A:
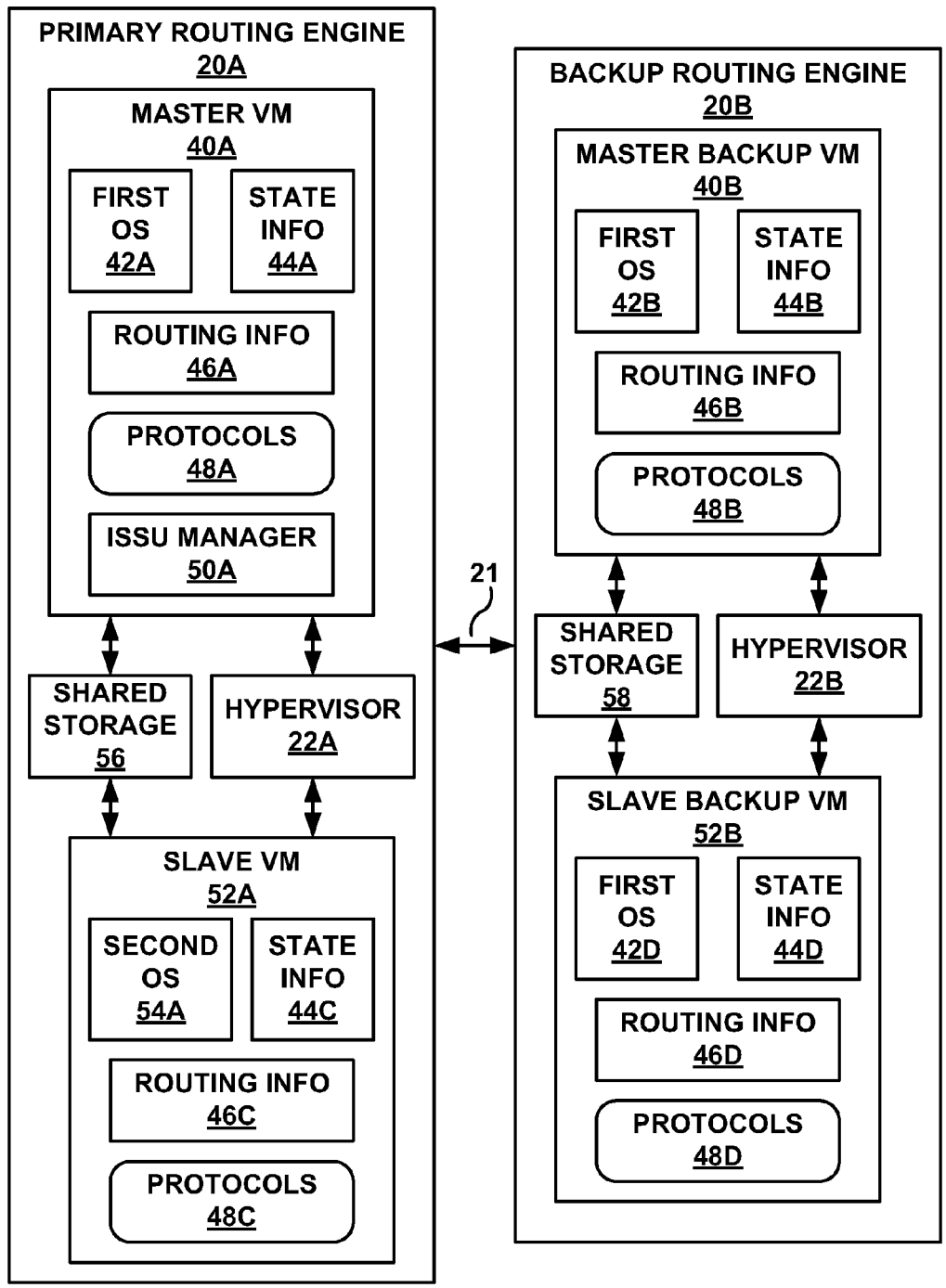
FIGS. 3A-3E are logical diagrams illustrating various software processes executed on hardware components of a primary routing engine and a backup routing engine of a router at different stages of an in-service software upgrade with high availability.

FIG. 3A illustrates primary RE 20A of router 12A comprising master VM 40A configured to control an ISSU of primary RE 20A with ISSU manager 50A and slave VM 52A. FIG. 3A further illustrates backup RE 20B comprising master backup VM 40B and slave backup VM 52B. As described above with respect to FIG. 2, router 12A may be configured to run one or more virtual machines on primary RE 20A through hypervisor 22A running on top of kernel 24A, and configured to run one or more virtual machines on backup RE 20B through hypervisor 22B running on top of kernel 24B.

Before, during, and after the ISSU process, router 12A may use keep-alive or heartbeat mechanisms to monitor the health of the virtual machines on both primary RE 20A and backup RE 20B. More specifically, the heartbeat mechanisms may detect a failure of one or more of the virtual machines 40A, 40B, 52A and 52B. If a failure is detected on master VM 40A on primary RE 20, for example, hypervisor 22A may switch control of the routing session to slave VM 52A on primary RE 20A, or hypervisor 22A may communicate with hypervisor 22B to switch control of the routing session to master backup VM 40B on backup RE 20B, depending on which virtual machine is executing the same software system as master VM 40A.

Prior to the ISSU, master VM 40A on primary RE 20A may be configured to operate as the master virtual machine of router 12A, which controls a routing session on behalf of router 12A. Master backup VM 40B on backup RE 20B may be configured to operate as a slave or backup virtual machine to master VM 40A. For example, as a slave virtual machine, master backup VM 40B may continually synchronize with master VM 40A via Ethernet connection 21 to update state information 44B, routing information 46B, and protocols 48B based on state information 44A, routing information 46A, and protocols 48A from master VM 40A. If master VM 40A were to fail due to a software failure of first OS 42A or a hardware failure of primary RE 20A, master backup VM 40B may take over control of the routing session. In this way, master backup VM 40B may provide high availability to router 12A during operation of the routing session by master VM 40A.

In response to receiving an ISSU request for router 12A, master VM 40A initializes an ISSU manager 50A to control the ISSU process. The ISSU request may be received from, for example, a user or administrator of router 12A via a user interface. In other examples, the ISSU request may be scheduled or preprogrammed to occur without user or administrator involvement. ISSU manager 50A requests initialization of slave VM 52A on primary RE 20A via hypervisor 22A. ISSU manager 50A also requests initialization of slave backup VM 52B on backup RE 20B via hypervisor 22B.

Slave VM 52A on primary RE 20A may be configured to operate as a slave or backup virtual machine to master VM 40A. For example, as a slave virtual machine, slave VM 52A may continually synchronize with master VM 40A via shared storage 56 to update state information 44C, routing information 46C, and protocols 48C based on state information 44A, routing information 46A, and protocols 48A from master VM 40A. Similarly, slave backup VM 52B on backup RE 20B may be configured to operate as a slave or backup virtual machine to master backup VM 40B, which is in turn a slave virtual machine to master VM 40A on primary RE 20A. For example, as a slave virtual machine, slave backup VM 52B may continually synchronize with master backup VM 40B via shared storage 58 to update state information 44D, routing information 46D, and protocols 48D based on state information 44B, routing information 46B, and protocols 48B from master backup VM 40B.

Upon initialization, both slave VM 52A on primary RE 20A and slave backup VM 52B on backup RE 20B may execute a first operating system. For example, slave backup VM 52B executes first OS 42D, which is the same software system as first OS 42A executed on master VM 40A and first OS 42B executed on master backup VM 40B. To perform the ISSU of router 12A, ISSU manager 50A first upgrades the software system of slave VM 52A on primary RE 20A to second OS 54A. For example, ISSU manager 50A may install second OS 54A onto the newly initialized slave VM 52A on primary RE 20A via hypervisor 22A by copying a disk image from memory 36A or another external source. For example, if first OS 42A on master VM 40A is a first version of an operating system, then second OS 54A on slave VM 52A may be an updated version of the operating system, an entirely new version of the operating system, or an entirely different operating system. Hypervisor 22A may then reboot slave VM 52A. After slave VM 52A reboots running second OS 54A, slave VM 52A synchronizes with master VM 40A via shared storage 56. Slave VM 52A may synchronize by replicating state information 44A from master VM 40A into state information 44C on slave VM 52A via shared storage 56.

At this point, master VM 40A and slave VM 52A on primary RE 20A are executing different software systems, respectively, first OS 42A and second OS 54A. Master backup VM 40B on backup RE 20B, however, is still executing the same software system, first OS 42B, as master VM 40A on primary RE 20A. According to the techniques, master backup VM 40B on backup RE 20B executing first OS 42B may, therefore, continue to provide high availability for router 12A during the ISSU of primary RE 20A. In this way, because the ISSU is performed by first updating a newly initialized slave VM 52A on primary RE 20A, the redundant software system on master backup VM 40B is not destroyed and high availability remains even during the ISSU.

If the ISSU of primary RE 20A fails before completion, master VM 40A and slave VM 52A may continue executing different software systems. In this case, if master VM 40A were to fail due to either software or hardware failure, a graceful restart, e.g., GRES, may not be performed between master VM 40A and slave VM 52A because the virtual machines are running two different software systems. The techniques described in this disclosure, enable a graceful restart to be performed between master VM 40A on primary RE 20A and master backup VM 40B on backup RE 20B because both virtual machines are running the same software system, first OS 42A, B. In this case, after the switchover from master VM 40A on primary RE 20A to master backup VM 40B on backup RE 20B, slave backup VM 52B may provide high availability for router 12A during operation of the routing session by master backup VM 40B.

In general, router 12A may reduce the impact of switching control of the routing session from master VM 40A on primary RE 20A to master backup VM 40B on backup RE 20B, or from master VM 40A to slave VM 52A on primary RE 20A, by supporting "non-stop forwarding" and "graceful restart." Non-stop forwarding refer to the ability of forwarding engine 26 to continue forwarding packets while router 12A simultaneously reestablishes a routing session. Graceful restart or GRES refers to the capability of preserving forwarding information while restarting a routing communication session, e.g., a BGP session.

When establishing a routing communication session, router 12A may advertise its non-stop forwarding and graceful restart capabilities to neighboring routers 12, including a restart time. The restart time reflects the estimated amount of time that it will take for router 12A to reestablish the routing communication session after failure of the previous session, e.g., approximately 120 seconds.

Master VM 40A may maintain forwarding state information 44A, which is replicated to all other virtual machines on router 12A. During a switchover, the stored state information enables router 12A to continue forwarding packets over routes that were available in the last-known state of the network. During the switchover, hypervisor 22A may manage communication and control for distributed packet forwarding devices, e.g., IFCs 30, within router 12A according to the last-known state maintained by master VM 40A. Concurrently during the switchover, master backup VM 40B or slave VM 52A may learn the network topology by receiving routing protocol updates from neighboring routers 12 and calculate its routing information and forwarding information. After the switchover, master backup VM 40B or slave VM 52A may assume control of the forwarding process according to the last-known state replicated from state information 44A on master VM 40A or according to a more recently learned state from the routing protocol updates. As a result, impact on current packet flows through the network during a switchover may be reduced.

Upon failure of the routing communication session, which may be caused by the switchover from master VM 40A to slave VM 52A or from master VM 40A to master backup VM 40B, other routers 12B-12F in network 10 may preserve forwarding information for router 12A based on the expectation that failed router 12A will reestablish the routing communication session shortly. Similarly, failed router 12A may preserve a state of forwarding information 28, e.g., state information 44A, that existed prior to the failure within master VM 40A. Consequently, surviving routers 12 do not need to find alternative routes unless failed router 12A does not reestablish the routing communication session within the advertised restart time. As a result, routing instability caused by routing flaps within the network (i.e., routers advertising a destination on a network as being unavailable, and shortly thereafter, advertising the destination as available again) may be reduced.

Performing ISSU within a single routing engine, e.g., primary RE 20A, using a virtual machine switchover may be less disruptive than switching between two separate routing engines, e.g., primary RE 20A to backup RE 20B. Specifically, the intra-RE virtual machine switchover may be less disruptive from the perspective of distributed packet forwarding devices, e.g., IFCs 30, because there is no switchover of the routing engine. In the case of an intra-RE virtual machine switchover, the distributed packet forwarding devices observe no change and control over the routing session may pass cleanly from master VM 40A to slave VM 52A.

Figure 3B:
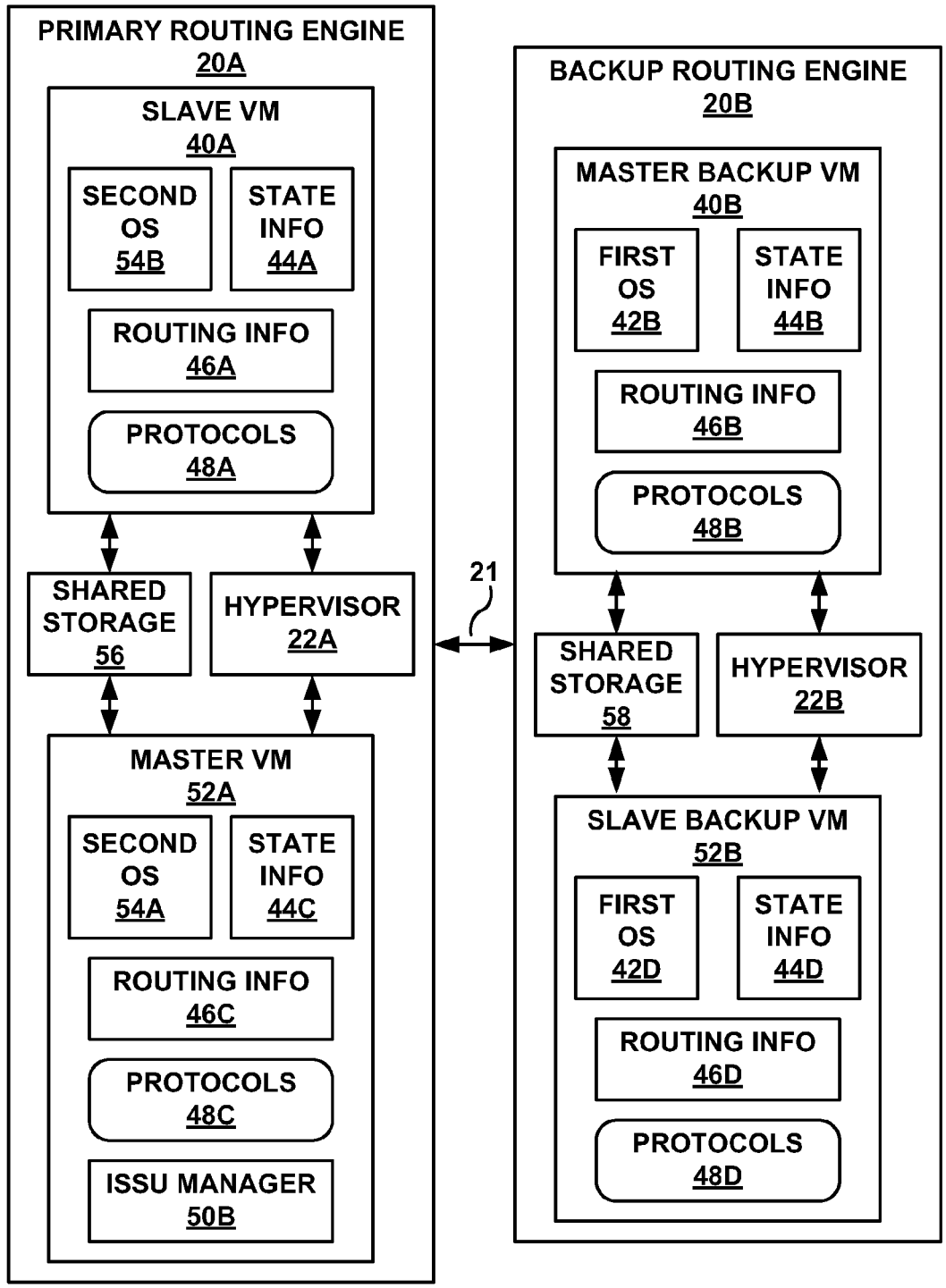

FIG. 3B illustrates primary RE 20A after the mastership of router 12A and control of the routing session has been transferred from master VM 40A to slave VM 52A. Once slave VM 52A is synchronized with master VM 40A, ISSU manager 50A may switch control of the routing session from master VM 40A to slave VM 52A on primary RE 20A via hypervisor 22A. The titles of the virtual machines on primary RE 20 illustrated in FIG. 3B have been changed to reflect the new master VM 52A and the new slave VM 40A.

After the switchover, master VM 52A initializes ISSU manager 50B on master VM 52A to control the remainder of the ISSU process. ISSU manager 50B may then upgrade the software system of slave VM 40A on primary RE 20A to second OS 54B. Second OS 54B may be the same operating system as second OS 54A executed on master VM 52A. For example, ISSU manager 50B may install second OS 54B onto slave VM 40A on primary RE 20A via hypervisor 22A by copying a disk image from memory 36A or another external source. Hypervisor 22A may then reboot slave VM 40A. After slave VM 40A reboots running second OS 54B, slave VM 40A synchronizes with master VM 52A via shared storage 56. Slave VM 40A may synchronize by replicating state information 44C from master VM 52A into state information 44A on slave VM 40A via shared storage 56.

At this point, master VM 52A and slave VM 40A on primary RE 20A are executing the same software systems, second OS 54A, B. According to the techniques, slave VM 40A on primary RE 20A may, therefore, provide high availability for router 12A during the ISSU of backup RE 20B. In this way, because primary RE 20A includes two virtual machines executing the same software system, high availability may be provided by master VM 52A and slave VM 40A on primary RE 20 even during the ISSU of backup RE 20B. In this case, if master VM 52A were to fail after completion of the ISSU of primary RE 20 due to either software or hardware failure, the techniques described in this disclosure enable a graceful restart to be performed between master VM 52A and slave VM 40A on primary RE 20A because both virtual machines are running the same software system, second OS 54A, B.

Figure 3C:
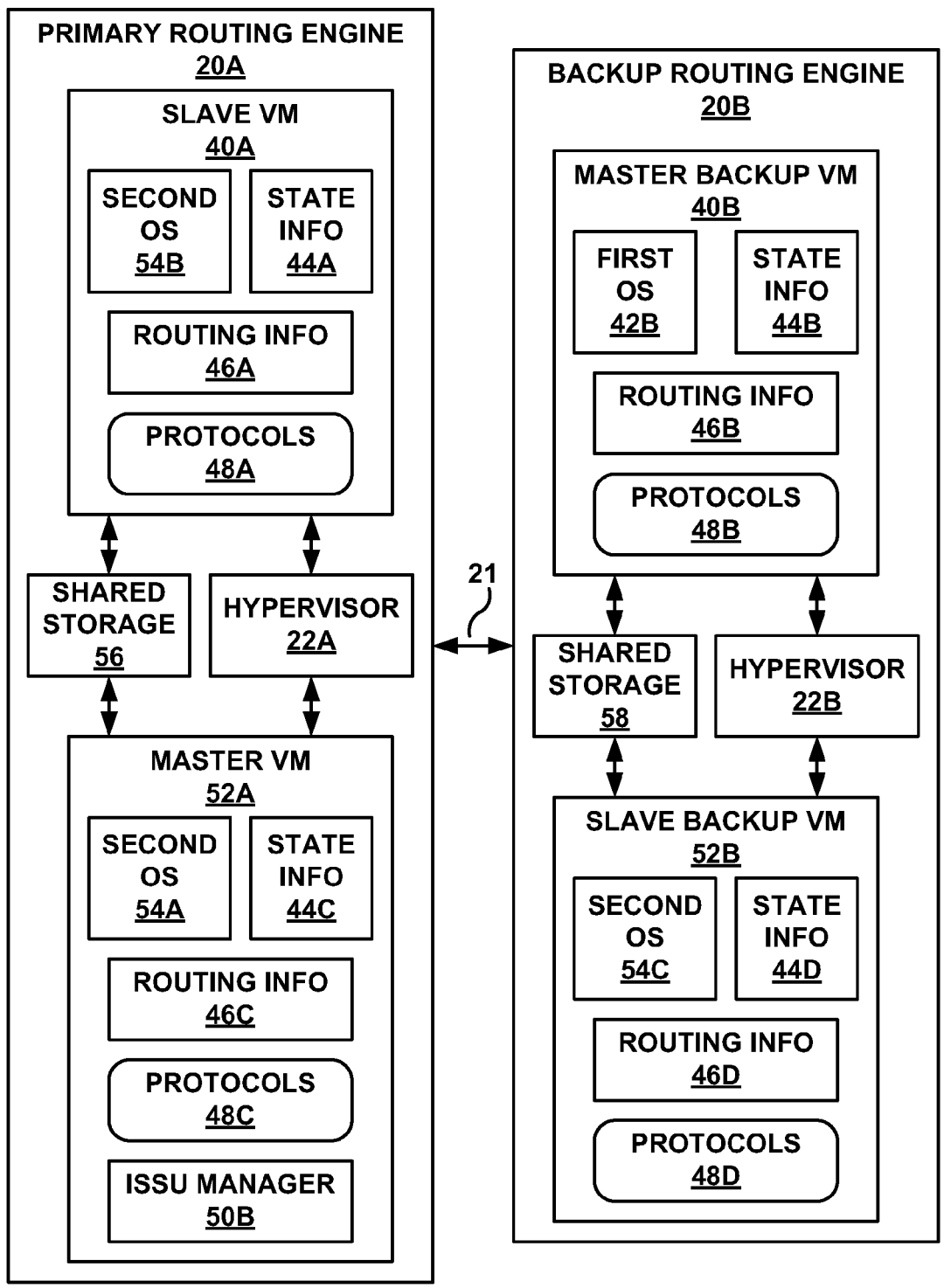

FIG. 3C illustrates backup RE 20B during the ISSU of backup RE 20B. After the ISSU of primary RE 20A completes, ISSU manager 50B of master VM 52A on primary RE 20A upgrades the software system of slave backup VM 52B on backup RE 20B to second OS 54C. Second OS 54C may be the same operating system as second OS 54A executed on master VM 52A and second OS 54B executed on slave VM 40A on primary RE 20A. For example, ISSU manager 50B may install second OS 54C onto slave backup VM 52B on backup RE 20B via hypervisor 22A in communication with hypervisor 22B by copying a disk image from memory 36A, memory 36B, or another external source. Hypervisor 22B may then reboot slave backup VM 52B. After slave backup VM 52B reboots running second OS 54C, slave backup VM 52B synchronizes with master backup VM 40B via shared storage 58. Slave backup VM 52B may synchronize by replicating state information 44B from master backup VM 40B into state information 44D on slave backup VM 52B via shared storage 58.

As described above, master backup VM 40B operates as a master VM on backup RE 20B, but also operates as a slave VM that synchronizes with master VM 52A on primary RE 20A via Ethernet connection 21. Therefore, any information salve backup VM 52B replicates from master backup VM 40B via shared storage 58 is indirectly replicated from master VM 52A on primary RE 20A.

Figure 3D:
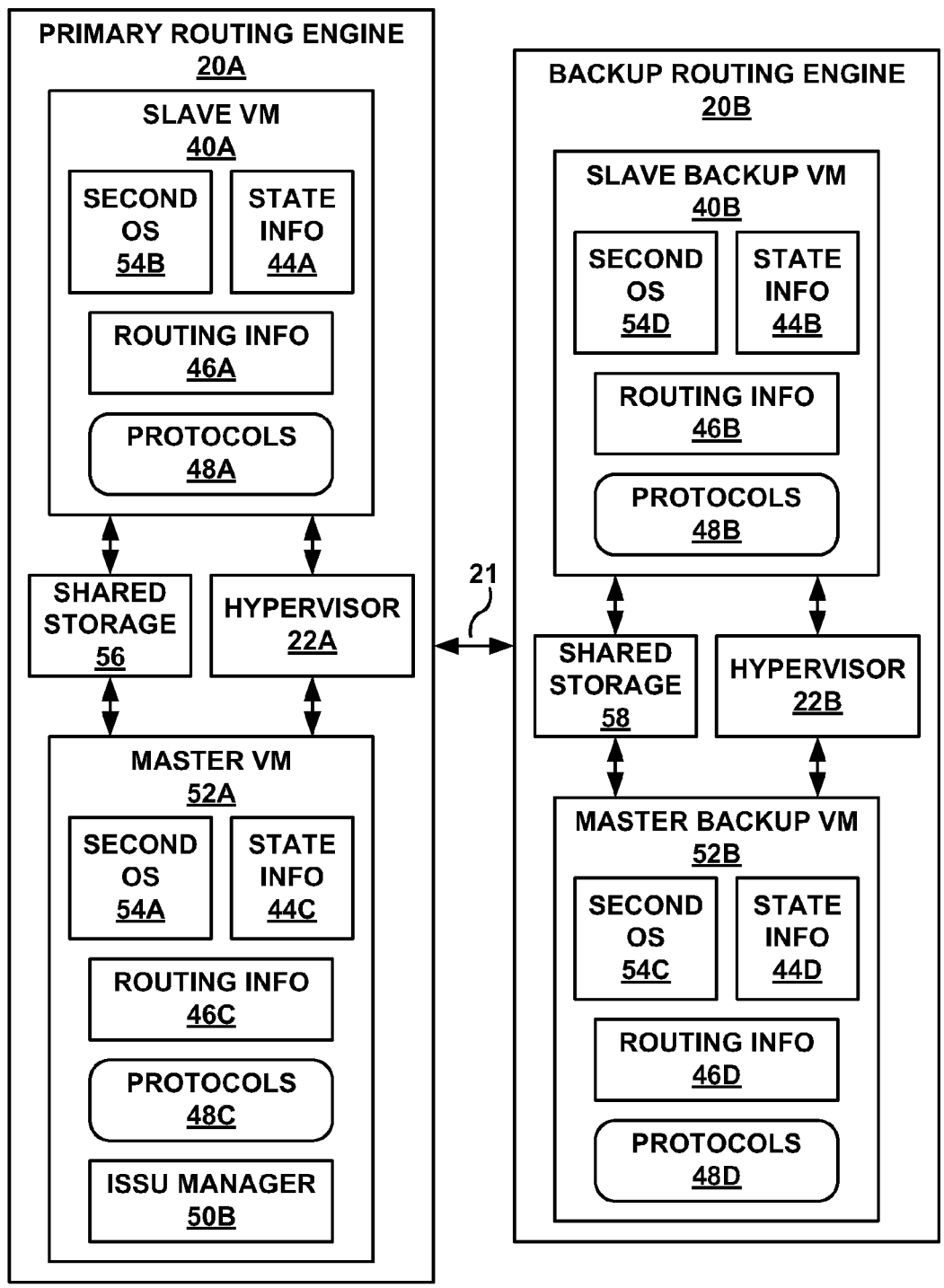

FIG. 3D illustrates backup RE 20B after the mastership of backup RE 20B has been transferred from master backup VM 40B to slave backup VM 52B. Once slave backup VM 52B is synchronized with master backup VM 40B, ISSU manager 50B may switch control of backup RE 20B from master backup VM 40B to slave backup VM 52B on backup RE 20B via hypervisor 22B. The titles of the virtual machines on backup RE 20B illustrated in FIG. 3D have been changed to reflect the new master backup VM 52B and the new slave backup VM 40B.

After the switchover, ISSU manager 50B may then upgrade the software system of slave backup VM 40B on backup RE 20B to second OS 54D. Second OS 54D may be the same operating system as second OS 54A executed on master VM 52A, second OS 54B executed on slave VM 40A, and second OS 54C executed on master backup VM 52B. For example, ISSU manager 50B may install second OS 54D onto slave backup VM 40B on backup RE 20B via hypervisor 22A in communication with hypervisor 22B by copying a disk image from memory 36A, memory 36B, or another external source. Hypervisor 22B may then reboot slave backup VM 40B. After slave backup VM 40B reboots running second OS 54D, slave backup VM 40B synchronizes with master backup VM 52B via shared storage 58. Slave backup VM 40B may synchronize by replicating state information 44D from master backup VM 52B into state information 44C on slave backup VM 40B via shared storage 58.

As described above, master backup VM 52B operates as a master VM on backup RE 20B, but also operates as a slave VM that synchronizes with master VM 52A on primary RE 20A via Ethernet connection 21. Therefore, any information slave backup VM 40B replicates from master backup VM 52B via shared storage 58 is indirectly replicated from master VM 52A on primary RE 20A.

At this point, the ISSU of both primary RE 20A and backup RE 20B are complete and all the virtual machines are executing the same software systems OS 54A-54D. ISSU manager 50B on master VM 52A on primary RE 20A may then request hypervisor 22A to terminate slave VM 40A on primary RE 20A. ISSU manager 50B may also request hypervisor 22B to terminate slave backup VM 40B on backup RE 20B.

Figure 3E:
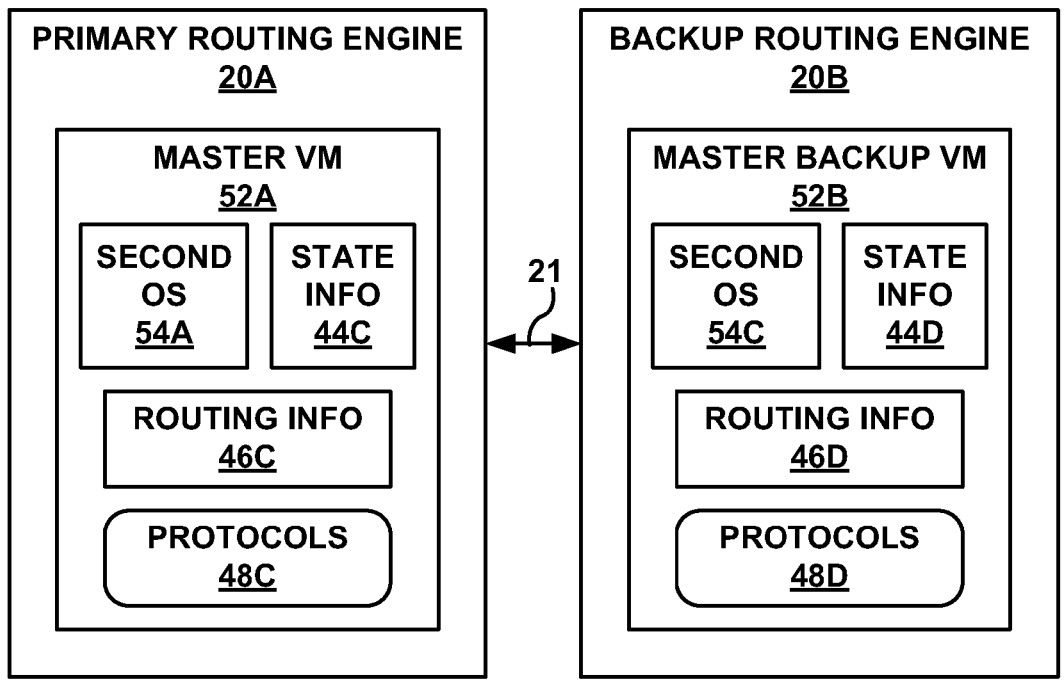

FIG. 3E illustrates primary RE 20A with master VM 52A and backup RE 20B with master backup VM 52B after the ISSU of router 12A is complete, and slave VM 40A and slave backup VM 40B have been terminated. At this point, master VM 52A on primary RE 20A and master backup VM 52B on backup RE 20B are both executing the same software systems, second OS 54A, C. Master backup VM 52B on backup RE 20B may, therefore, provide high availability for router 12A during the operation of the routing session by master VM 52A of primary RE 20A.

As illustrated in FIGS. 3A-3E, the techniques described herein enable an ISSU to be performed on a router with dual routing engines while providing high availability for the router during the entire ISSU process.

Figure 4:
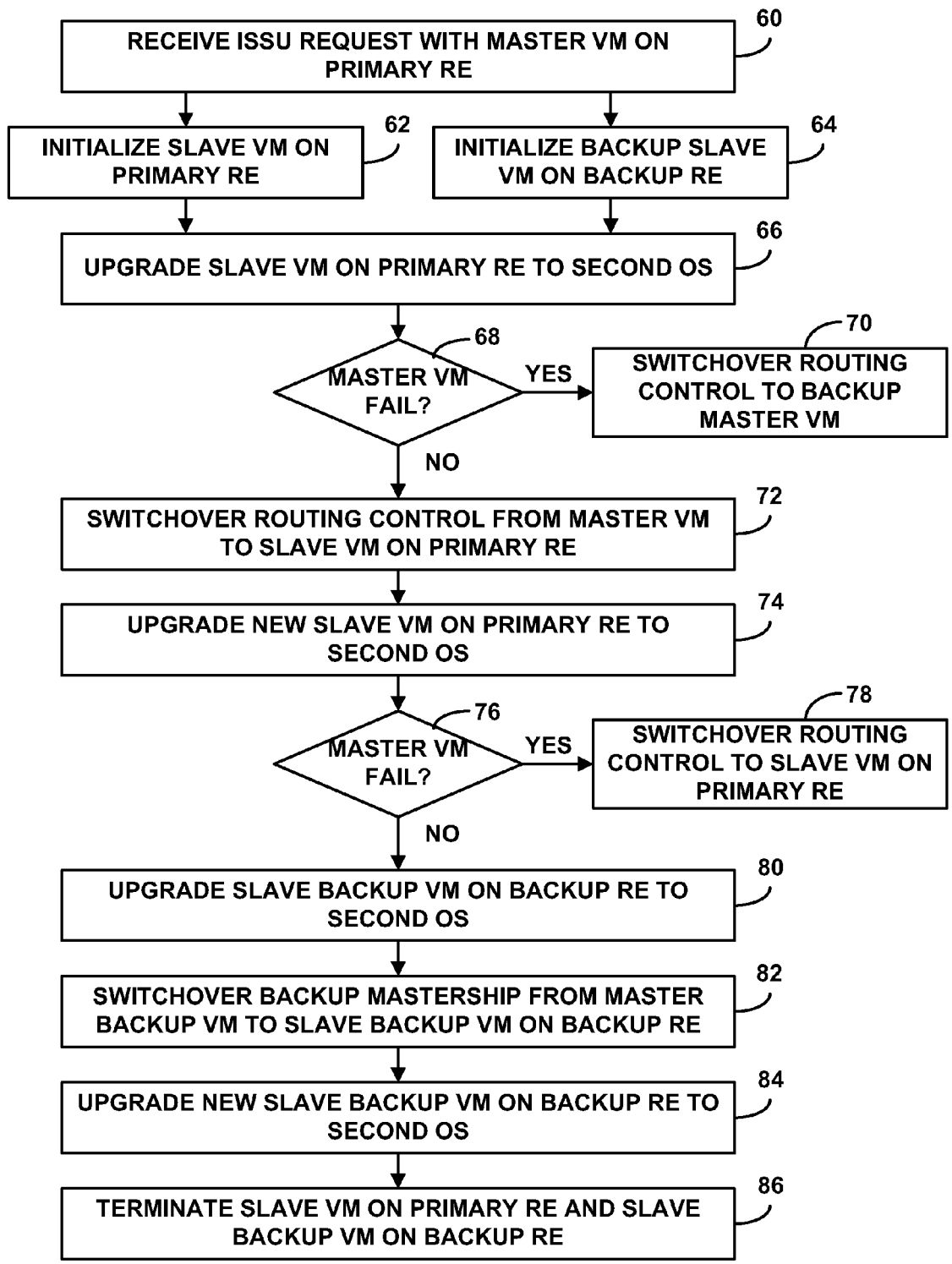
FIG. 4 is a flowchart illustrating an exemplary operation of a router with dual routing engines during an in-service software upgrade with high availability.

FIG. 4 is a flowchart illustrating an exemplary operation of a router with dual routing engines during an in-service software upgrade with high availability. The illustrated method will be described with respect to primary RE 20A and backup RE 20B of router 12A of FIGS. 3A-3E. Prior to an ISSU on primary RE 20A, master VM 40A on primary RE 20A and master backup VM 40B on backup RE 20B both execute the same software system, respectively, first OS 42A and second OS 42B, such that master backup VM 40B provides high availability to router 12A.

An ISSU process is initiated when master VM 40A running on primary RE 20A of router 12A receives an ISSU request (60). In some examples, master VM 40A may receive the ISSU request from an administrator via a user interface. In response to receiving the ISSU request, master VM 40A initializes an ISSU manager 50A on master VM 40A. ISSU manager 50A requests hypervisor 22A to initialize slave VM 52A on primary RE 20A (62). ISSU manager 50A also requests hypervisor 22B to initialize slave backup VM 52B on backup RE 20B (64). Both slave VM 52A on primary RE 20A and slave backup VM 52B on backup RE 20B may execute a first operating system upon initialization. For example, slave backup VM 52B executes first OS 42D, which is the same software system as first OS 42A executed on master VM 40A and first OS 42B executed on master backup VM 40B.

To perform the ISSU of primary RE 20A, ISSU manager 50A upgrades slave VM 52A on primary RE 20A to execute a second OS 54A (66). Second OS 54A may comprise a new version of first OS 42A. After slave VM 52A reboots, slave VM 52A synchronizes with master VM 40A via shared storage 56. For example, slave VM 52A may replicate state information 44A from master VM 40A to state information 44C on slave VM 52A via shared storage 56.

At this point, master VM 40A and slave VM 52A on primary RE 20A are executing different software systems, respectively, first OS 42A and second OS 54A. According to the techniques, master backup VM 40B on backup RE 20B executing first OS 42B may provide high availability for router 12A during the ISSU of primary RE 20A. If master VM 40A fails before completion of the ISSU of primary RE 20A (YES branch of 68), control of the routing session may be switched from master VM 40A on primary RE 20A to master backup VM 40B on backup RE 20B because both virtual machines are running the same software systems (70).

If master VM 40A does not fail (NO branch of 68), ISSU manager 50A may continue the ISSU of primary RE 20A by switching control of the routing session from master VM 40A to slave VM 52A on primary RE 20A via hypervisor 22A (72). After the switchover, new master VM 52A may initialize an ISSU manager 50B on master VM 52A. ISSU manager 50B may then upgrade new slave VM 40A on primary RE 20A to execute a second OS 54B (74). At this point, master VM 52A and slave VM 40A on primary RE 20A are both executing the same software systems, second OS 54A, B. According to the techniques, slave VM 40A on primary RE 20A may provide high availability for router 12A during operation of the routing session by master VM 52A on primary RE 20A. If master VM 52A fails after completion of the ISSU of primary RE 20A (YES branch of 76), control of the routing session may be switched from master VM 52A to slave VM 40A on primary RE 20A because both virtual machines are running the same software systems (78).

If master VM 52A does not fail (NO branch of 76), ISSU manager 50B may perform the ISSU of backup RE 20B. ISSU manager 50B upgrades slave backup VM 52B on backup RE 20B to execute a second OS 54C (80). After slave backup VM 52B reboots, slave backup VM 52B synchronizes with master backup VM 40B via shared storage 58. For example, slave backup VM 52B may replicate state information 44B from master backup VM 40B to state information 44D on slave backup VM 52B via shared storage 58. As described above, master backup VM 40B operates as a master VM on backup RE 20B, but also operates as a slave VM that synchronizes with master VM 52A on primary RE 20A via Ethernet connection 21.

After synchronization, ISSU manager 50B may then continue the ISSU of backup RE 20B by switching the mastership of backup RE 20B from master backup VM 40B to slave backup VM 52B on backup RE 20B via hypervisor 22B (82). After the switchover, ISSU manager 50B may then upgrade new slave backup VM 40B on backup RE 20B to execute a second OS 54D (84).

At this point, the ISSU of both primary RE 20A and backup RE 20B are complete and all the virtual machines are executing the same software systems OS 54A-54D. ISSU manager 50B on master VM 52A on primary RE 20A may then request hypervisor 22A to terminate slave VM 40A on primary RE 20A, and request hypervisor 22B to terminate slave backup VM 40B on backup RE 20B (86). After termination, master VM 52A on primary RE 20A and master backup VM 52B on backup RE 20B are both executing the same software systems, second OS 54A, C. Master backup VM 52B on backup RE 20B may provide high availability for router 12A during operation of the routing session by master VM 52A on primary RE 20A.

In the above examples, the techniques for ISSU with high availability using virtual machines are described as being performed within a physical device, e.g., router 12A included in a physical network 10. In other examples, the techniques may be performed within a virtual device included in a virtual network. A virtual network or modeled network may be used to conduct testing of the disclosed ISSU techniques and other techniques within a virtual device prior to implementation within a physical device. The virtual network may be constructed to model certain network conditions in order to test how the disclosed ISSU techniques or other techniques within a network device may react. Moreover, the virtual device may be construed to test how the disclosed ISSU techniques or other techniques react during different device failures, e.g., software and hardware failures. In some example, the virtual network and/or virtual device may also be used for teaching purposes.

Various examples of the invention have been described. These and other examples are within the scope of the following claims.

The invention claimed is:

1. A method comprising:
running a first virtual machine (VM) on a primary control unit of a network device, wherein the first VM executes a first operating system that controls routing functionality of the network device and controls an in-service software upgrade (ISSU) of the network device;
running a first backup VM on a backup control unit of the network device, wherein the first backup VM executes the first operating system and provides high availability for the network device during operation of the routing functionality by the first VM;
in response to receiving an ISSU request with the first VM on the primary control unit, initializing a second VM on the primary control unit and a second backup VM on the backup control unit, wherein each of the second VM and the second backup VM execute the first operating system;
performing the ISSU on the primary control unit by upgrading the second VM to a second operating system, switching control of the routing functionality from the first VM to the second VM, and upgrading the first VM to the second operating system, wherein, when the first VM and the second VM are executing different operating systems, the first and second backup VMs executing the first operating system on the backup control unit provide high availability for the network device during the ISSU of the primary control unit; and
if the first VM on the primary control unit fails during the ISSU when the first VM and the second VM are executing different operating systems, switching control of the routing functionality from the first VM on the primary control unit to the first backup VM on the backup control unit, wherein the second backup VM on the backup control unit provides high availability for the network device during operation of the routing functionality by the first backup VM.

2. The method of claim 1, wherein the first backup VM on the backup control unit provides high availability for the network device by providing graceful restart between the first VM executing the first operating system on the primary control unit and the first backup VM executing the first operating system on the backup control unit in response to a failure event during the ISSU.

3. The method of claim 1, wherein upgrading the second VM on the primary control unit comprises:
installing the second operating system on the second VM;
rebooting the second VM; and
synchronizing the second VM with the first VM on the primary control unit by replicating state information from the first VM onto the second VM via a shared storage between the first and second VMs on the primary control unit.

4. The method of claim 1, wherein, when the ISSU on the primary control unit is complete, the first VM provides high availability for the network device during operation of the routing functionality by the second VM on the primary control unit.

5. The method of claim 1, further comprising, if the second VM on the primary control unit fails after the ISSU of the primary control unit is complete, switching control of the routing functionality from the second VM on the primary control unit to the first VM on the primary control unit.

6. The method of claim 1, further comprising, when the ISSU of the primary control unit is complete, performing the ISSU on the backup control unit by upgrading the second backup VM to the second operating system, switching control of the backup control unit from the first backup VM to the second backup VM, and upgrading the first backup VM to the second operating system.

7. The method of claim 6, wherein upgrading the second backup VM on the backup control unit comprises:
installing the second operating system on the second backup VM;
rebooting the second backup VM; and
synchronizing the second backup VM with the first backup VM on the backup control unit by replicating state information from the first backup VM onto the second backup VM via a shared storage between the first and second backup VMs on the backup control unit, wherein the first backup VM synchronizes with the second VM on the primary control unit.

8. The method of claim 6, wherein, when the ISSU of the network device is complete, the second backup VM on the backup control unit provides high availability for the network device during operation of the routing functionality by the second VM on the primary control unit.

9. The method of claim 6, further comprising, when the ISSU of the network device is complete, terminating the first VM on the primary control unit and terminating the first backup VM on the backup control unit.

10. The method of claim 1, wherein the first operating system comprises a first version of an operating system for the network device and the second operating system comprises a second version of the same operating system.

11. The method of claim 1, wherein the first VM on the primary control unit comprises a master VM and the second VM on the primary control unit comprises a slave VM that synchronizes with the first VM.

12. The method of claim 11, wherein the first backup VM on the backup control unit comprises a slave VM that synchronizes with the first VM on the primary control unit, and wherein the first backup VM on the backup control unit also comprises a master VM of the backup control unit and the second backup VM on the backup control unit comprises a slave VM that synchronizes with the first backup VM.

13. The method of claim 1, wherein the network device comprises a router, and wherein the primary control unit comprises a primary routing engine and the backup control unit comprises a backup routing engine.

14. A network device comprising:
a primary control unit;
a backup control unit;
a first hypervisor that runs one or more virtual machines on the primary control unit;
a second hypervisor that runs one or more virtual machines on the backup control unit;

a first virtual machine (VM) running on the primary control unit, wherein the first VM is configured to execute a first operating system that controls routing functionality of the network device and controls an in-service software upgrade (ISSU) of the network device; and a first backup VM running on the backup control unit, wherein the first backup VM is configured to execute the first operating system and provide high availability for the network device during operation of the routing functionality by the first VM, wherein, in response to receiving an ISSU request with the first VM on the primary control unit, the first VM requests initialization of a second VM on the primary control unit by the first hypervisor and a second backup VM on the backup control unit by the second hypervisor, wherein each of the second VM and the second backup VM execute the first operating system, wherein the first VM controls performance of the ISSU on the primary control unit to upgrade the second VM to a second operating system, switch control of the routing functionality from the first VM to the second VM, and upgrade the first VM to the second operating system, wherein, when the first VM and the second VM are executing different operating systems, the first and second backup VMs executing the first operating system on the backup control unit provide high availability for the network device during the ISSU of the primary control unit, and wherein, if the first VM on the primary control unit fails during the ISSU when the first VM and the second VM are executing different operating systems, the first and second hypervisors switch control of the routing functionality from the first VM on the primary control unit to the first backup VM on the backup control unit, wherein the second backup VM on the backup control unit provides high availability for the network device during operation of the routing functionality by the first backup VM.

15. The network device of claim 14, wherein the first backup VM on the backup control unit provides high availability for the network device by providing graceful restart between the first VM executing the first operating system on the primary control unit and the first backup VM executing the first operating system on the backup control unit in response to a failure event during the ISSU.

16. The network device of claim 14, wherein, in response to requests from the first VM on the primary control unit, the first hypervisor upgrades the second VM on the primary control unit by:
    installing the second operating system on the second VM;
    rebooting the second VM; and
    synchronizing the second VM with the first VM on the primary control unit by replicating state information from the first VM onto the second VM via a shared storage between the first and second VMs on the primary control unit.

17. The network device of claim 14, wherein, when the ISSU of the primary control unit is complete, the first VM provides high availability for the network device during operation of the routing functionality by the second VM on the primary control unit.

18. The network device of claim 14, wherein, if the second VM on the primary control unit fails after the ISSU of the primary control unit is complete, the first hypervisor switches control of the routing functionality from the second VM on the primary control unit to the first VM on the primary control unit.

19. The network device of claim 14, wherein, when the ISSU on the primary control unit is complete, the second VM on the primary control unit controls performance of the ISSU on the backup control unit to upgrade the second backup VM to the second operating system, switch control of the backup control unit from the first backup VM to the second backup VM, and upgrade the first backup VM to the second operating system.

20. The network device of claim 19, wherein, in response to requests from the second VM on the primary control unit, the second hypervisor upgrades the second backup VM on the backup control unit by:
    installing the second operating system on the second backup VM;
    rebooting the second backup VM; and
    synchronizing the second backup VM with the first backup VM on the backup control unit by replicating state information from the first backup VM onto the second backup VM via a shared storage between the first and second backup VMs on the backup control unit, wherein the first backup VM synchronizes with the second VM on the primary control unit.

21. The network device of claim 19, wherein, when the ISSU of the network device is complete, the second backup VM on the backup control unit provides high availability for the network device during operation of the routing functionality by the second VM on the primary control unit.

22. The network device of claim 19, wherein, when the ISSU of the network device is complete, the first hypervisor terminates the first VM on the primary control unit, and the second hypervisor terminates the first backup VM on the backup control unit.

23. The network device of claim 14, wherein the first operating system comprises a first version of an operating system for the network device and the second operating system comprises a second version of the same operating system.

24. The network device of claim 14, wherein the first VM on the primary control unit comprises a master VM and the second VM on the primary control unit comprises a slave VM that synchronizes with the first VM.

25. The network device of claim 24, wherein the first backup VM on the backup control unit comprises a slave VM that synchronizes with the first VM on the primary control unit, and wherein the first backup VM on the backup control unit also comprises a master VM of the backup control unit and the second backup VM on the backup control unit comprises a slave VM that synchronizes with the first backup VM.

26. The network device of claim 14, wherein the network device comprises a router, and wherein the primary control unit comprises a primary routing engine and the backup control unit comprises a backup routing engine.

27. A non-transitory, computer-readable storage medium comprising instructions that cause one or more programmable processors to:
    run a first virtual machine (VM) on a primary control unit of a network device, wherein the first VM executes a first operating system that controls routing functionality of the network device and controls an in-service software upgrade (ISSU) of the network device;
    run a first backup VM on a backup control unit of the network device, wherein the first backup VM executes the first operating system and provides high availability for the network device during operation of the routing functionality by the first VM;
    in response to receiving an ISSU request with the first VM on the primary control unit, initialize a second VM on the primary control unit and a second backup VM on the backup control unit, wherein each of the second VM and the second backup VM execute the first operating system;

perform the ISSU of the primary control unit by upgrading the second VM to a second operating system, switching control of the routing functionality from the first VM to the second VM, and upgrading the first VM to the second operating system, wherein, when the first VM and the second VM are executing different operating systems, the first and second backup VMs executing the first operating system on the backup control unit provide high availability for the network device during the ISSU of the primary control unit; and if the first VM on the primary control unit fails during the ISSU when the first VM and the second VM are executing different operating systems, switching control of the routing functionality from the first VM on the primary control unit to the first backup VM on the backup control unit, wherein the second backup VM on the backup control unit provides high availability for the network device during operation of the routing functionality by the first backup VM.

\* \* \* \* \*